United States Patent

[11] 3,550,877

[72] Inventors Robert C. Sutliff;
　　　　　　　Archie J. Tucker, Rochester, N.Y.
[21] Appl. No. 813,526
[22] Filed Apr. 4, 1969
[45] Patented Dec. 29, 1970
[73] Assignee Eastman Kodak Company
　　　　　　　Rochester, N.Y.
　　　　　　　a corporation of New Jersey

[54] CARTRIDGE AND METHOD FOR REMOVING FILM FROM THE CARTRIDGE
5 Claims, 6 Drawing Figs.

[52] U.S. Cl. .................................................. 242/180
[51] Int. Cl. .................................................. G03b 1/04
[50] Field of Search .................................... 242/180, 194, 71.2

[56] References Cited
UNITED STATES PATENTS
1,136,335　4/1915　Hetherington ............... 242/180
3,208,686　9/1965　Edwards et al. ............... 242/194

*Primary Examiner*—Nathan L. Mintz
*Attorneys*—R. W. Hampton and William F. De Laney, Jr.

ABSTRACT: A method of removing exposed film from camera cartridges of the type having a takeup spool on which the film is wound, and having an antibackup shuttle which prevents reverse rotation of the spool to unwind the film. The antibackup shuttle is disabled by a punch which punctures the side of the cartridge and displaces the shuttle axially to an inoperative position in a cavity defined by the spool, and the exposed film is then unwound through the exposure aperture as the spool rotates in reverse. To facilitate operation of the punch the cartridge can be provided with openings defined by the internal structure of the cartridge along the predetermined path of the punch. A sidewall of the cartridge can define weakened portions where the wall is to be punctured to reduce resistance to puncture.

PATENTED DEC29 1970

ROBERT C. SUTLIFF
ARCHIE J. TUCKER
INVENTORS

BY William F. Delany Jr.

Robert W Hampton

ATTORNEYS

ROBERT C. SUTLIFF
ARCHIE J. TUCKER
INVENTORS

CARTRIDGE AND METHOD FOR REMOVING FILM FROM THE CARTRIDGE

BACKGROUND OF THE INVENTION

The present invention relates to film cartridges in which a roll of film is sealed before, during and after exposure in a camera, and to a method and apparatus for removing exposed film from such cartridges for processing.

Many commercially available movie camera cartridges include a substantially rectangular housing in which a supply roll of film and a takeup spool are rotatable mounted in a side-by-side coaxial relation, such as disclosed for example in U.S. Pat. No. 3,208,686 issued Sept. 28, 1965 in the name of E. A. Edwards et al. As initially loaded, a film leader is pulled from the supply roll, threaded past an exposure aperture in an end wall of the cartridge and then attached to the takeup spool. After being so loaded with unexposed film, the housing is closed and sealed by one or more covers.

Usually such cartridges also include devices to overcome the tendency of coiled film to clockspring when the cartridge is subjected to sharp movements. The term "clockspring", as used herein, means radial displacement of successive outer convolutions of a film roll, caused by the tendency of the roll to unwind. Anticlockspring devices in the the takeup chamber of most commercial cartridges operate on the takeup spool in such a manner that reverse rotation of the spool is prevented, so that film on the spool cannot be unwound. Such devices often comprise a pawl and ratchet arrangement wherein a shuttle with a plurality of teeth engages teeth on the spool to prevent rotation of the spool in such direction. However, such devices prevent the film from being driven in a reverse direction for removal of the exposed film through the exposure aperture of the cartridge.

When the film in such a cartridge is to be exposed, the cartridge is placed in a motion picture camera adapted to accommodate the cartridge, and a film advancing mechanism in the camera engages perforations in the film during operation of the camera to intermittently pull film from the supply coil and transport it past the exposure aperture to the takeup spool. A takeup drive in the camera is coupled to the takeup spool of the cartridge to positively drive the core to wind up the exposed film.

When the film has been completely exposed, such cartridges may be sent intact to a processor. The processor must remove the film from the cartridge without exposing it to light, and this is presently accomplished by breaking the cartridge open and removing the film in a darkened area. A method and apparatus for opening expendable film cartridges is disclosed for example in U.S. Pat. No. 3,265,263 which issued to A. M. Lafontant et al. on Aug. 9, 1966. The film may then be removed and wound onto a large processing supply reel or be fed directly into a processing tank adapted to handle short lengths of film. Either method usually requires that exposed rolls of film be handled in the dark without losing control of the spool of film. The processor must also avoid scratching or damaging the film by chips of plastic resulting from the opening of the cartridge.

SUMMARY OF THE INVENTION

It is an object of this invention to provide an improved method and apparatus for removing exposed film from camera cartridges of the type having means for preventing reverse rotation of the takeup spool.

It is another object of this invention to provide such a cartridge with structure that simplifies film removal by the method of this invention.

According to this invention exposed film is removed from such film cartridges by disengaging the means for preventing reverse rotation of the takeup spool and then unwinding the film from the spool through the exposure aperture of the cartridge.

In the disclosed embodiment of the invention an antibackup shuttle in such a cartridge is disengaged from the takeup spool by a punch which punctures the side of the cartridge and displaces the shuttle axially to an inoperative position in a cavity defined by the spool, where it is retained while the film is unwound from the core and withdrawn through the exposure aperture. Preferably, the punch has two prongs which are adapted to puncture the supply side of the cartridge, proceed through openings defined by the internal structure of the cartridge along the predetermined paths of the prongs, and displace the shuttle axially into a cavity defined in the takeup spool. The shuttle has a slightly larger outer radial dimension than the cavity, so that the shuttle is deformed as it is pushed into the cavity by the punch. When the punch is withdrawn, the tendency of the shuttle to return to its original shape forces the outer edges of the shuttle against the walls of the cavity in an interference fit to retain the shuttle within the cavity. In this embodiment the cavity is provided with a rim along the periphery of its sidewall to prevent the shuttle from sliding out of the cavity.

To permit easier operation of the punch, a cartridge according to a preferred embodiment of this invention is provided with a cover on the supply side having one or more areas which are structurally weakened to permit easier puncturing by the punch, and the hub in the supply chamber of such cartridges is provided with openings along the predetermined path of the punch to provide the prongs with easier access to the shuttle.

This invention permits a processor to splice the trailing end of the exposed film in the exposure aperture of a cartridge to a leader or to attach it to a large rewind reel, and to disengage the shuttle in a lighted area because the film remains in the unopened cartridge during these steps. The cartridge and unwind mechanism may then be enclosed within a darkened chamber as film is withdrawn from the cartridge. Since the cartridge need not be broken open for film removal according to this invention, the processor need not concern himself with losing control of the exposed roll of film nor about scratches or damage resulting from chips of plastic resulting from opening the cartridge.

DETAILED DESCRIPTION OF THE DRAWINGS

Figure 1:
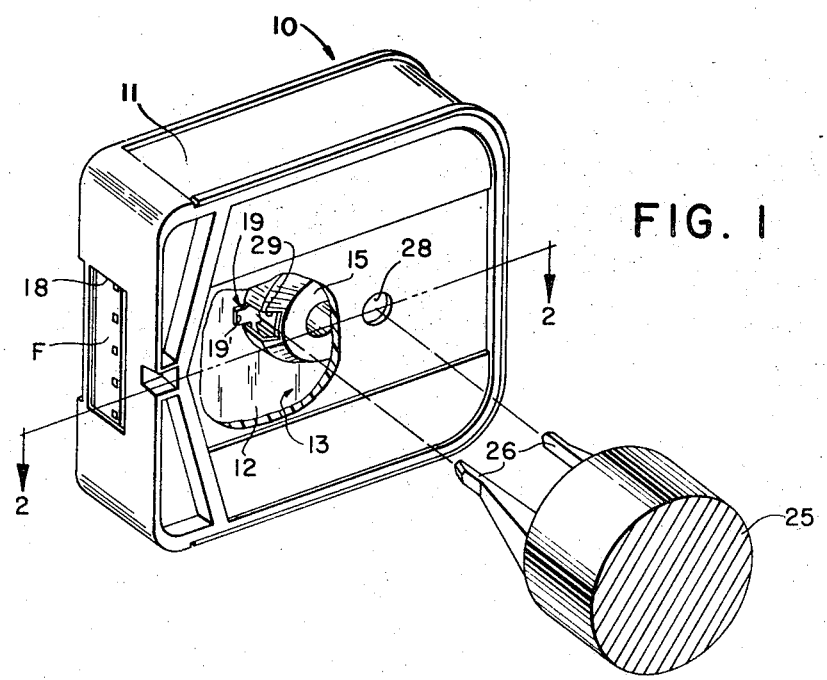
FIG. 1 is a perspective view of a cartridge according to the invention with a portion of the cartridge housing broken away, and a punch aligned with respect to the cartridge on a predetermined path to disengage an antibackup shuttle in the cartridge.

As shown in the drawings film F is withdrawn from a cartridge 10 according to a preferred embodiment of this invention which is particularly adapted for film removal according to the method of this invention.

Figure 2:
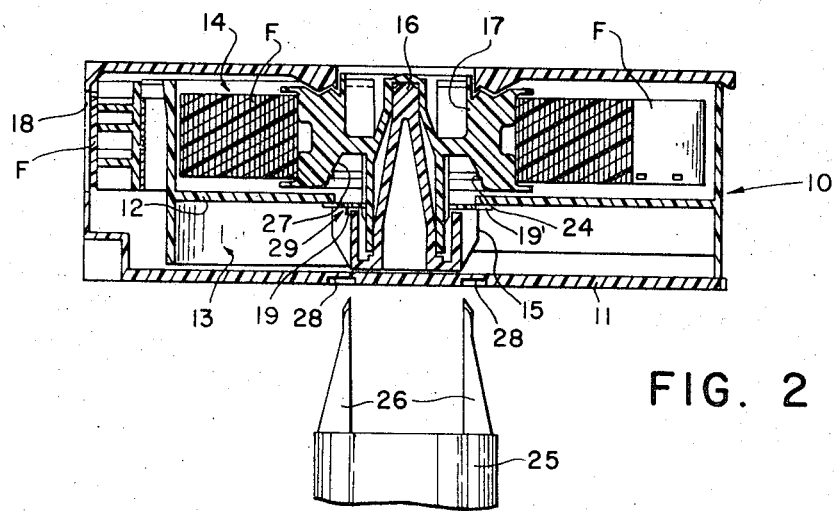
FIG. 2 is a cross-sectional view of the cartridge shown in FIG. 1 taken along the lines 2–2, and a side view of the punch.

As shown in FIG. 1 the cartridge 10 includes a substantially rectangular housing 11 and an internal partition 12 which define a supply chamber 13 and a takeup chamber 14, seen in FIG. 2. Located in the supply chamber 13 is a hub 15 mounted on the partition 12 for locating a supply roll of film, not shown. Mounted for rotation on a post 16 on the opposite side of the partition 12 is a takeup spool 17 for receiving and winding up exposed film F. As initially loaded, a film leader is pulled from the supply roll, threaded past an exposure aperture 18 in an end wall of the cartridge and then attached to the takeup spool 17 in the takeup chamber 14.

Figure 3:
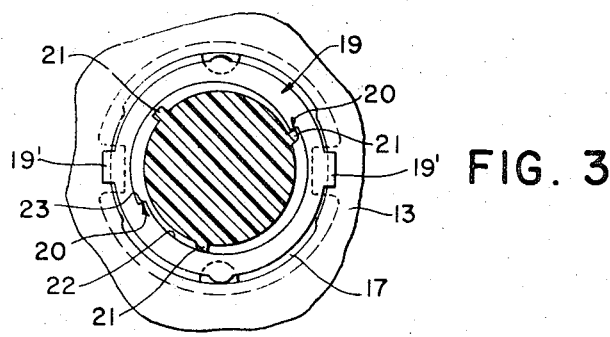
FIG. 3 is a plane view of the antibackup shuttle in the cartridge, and a cross-sectional view of the takeup core.

To prevent film wound on the takeup spool from clockspringing, the cartridge 10 includes an antibackup shuttle 19 mounted for transverse movement on the partition 12 with respect to the axis of rotation of the takeup spool. The shuttle 19 has inwardly extending teeth 20 which engage teeth 21 on the takeup spool. As seen more clearly in FIG. 3 the teeth 20 define gradually inclined surfaces 22 and sharply inclined surfaces 23, such that rotation of the takeup spool in a clockwise direction as viewed from the takeup side of the cartridge will cause the shuttle 19 to oscillate transversely to the axis of rotation of the spool with little resistance provided by the gradually inclined surfaces 22 of the teeth 20. However, rotation of the spool in a counterclockwise direction will cause one of the teeth 21 on the spool to operatively engage the sharply inclined surface 23 of one of the teeth 20 on the shuttle, so that rotation of the spool is prevented in that direction and film cannot be unwound from the spool.

According to the method of this invention, exposed film is removed from the cartridge 10 by disengaging the antibackup shuttle 19 from the spool 17 and withdrawing the film through the the exposure aperture 18 as the spool 17 rotates in reverse. In the disclosed embodiment the shuttle 19 is disengaged by a punch 25 having two prongs 26 which are adapted to puncture the supply side of the cartridge housing, engage the shuttle, and displace the shuttle axially toward the takeup side of the cartridge into a cavity 27 defined by the takeup spool 17. Along the peripheral edge of the cavity 27, the spool 17 is provided with a rim 24 extending radially inwardly such that the mouth of the cavity is reduced slightly in size. To permit easier operation of the punch 25, cartridge 10 is provided with a cover 11 having two portions 28 on the supply side of the cartridge, which are structurally weakened to permit easier puncturing by the punch prongs 26. In addition, the hub 15 in the cartridge supply chamber is provided with openings 29 located in the predetermined paths of the prongs 26 of the punch 25. The openings 29 are of sufficient size to provide clearance for the prongs to gain access to the shuttle 19.

Figure 4:
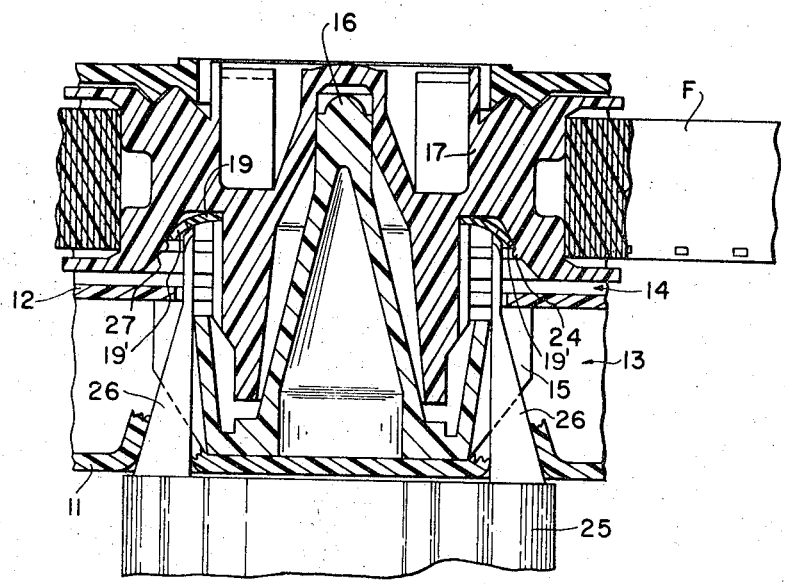
FIG. 4 is an enlarged cross-sectional view of a portion of the cartridge shown in FIG. 1 with the punch inserted into the cartridge and with the shuttle displaced into core cavity.
Figure 5:
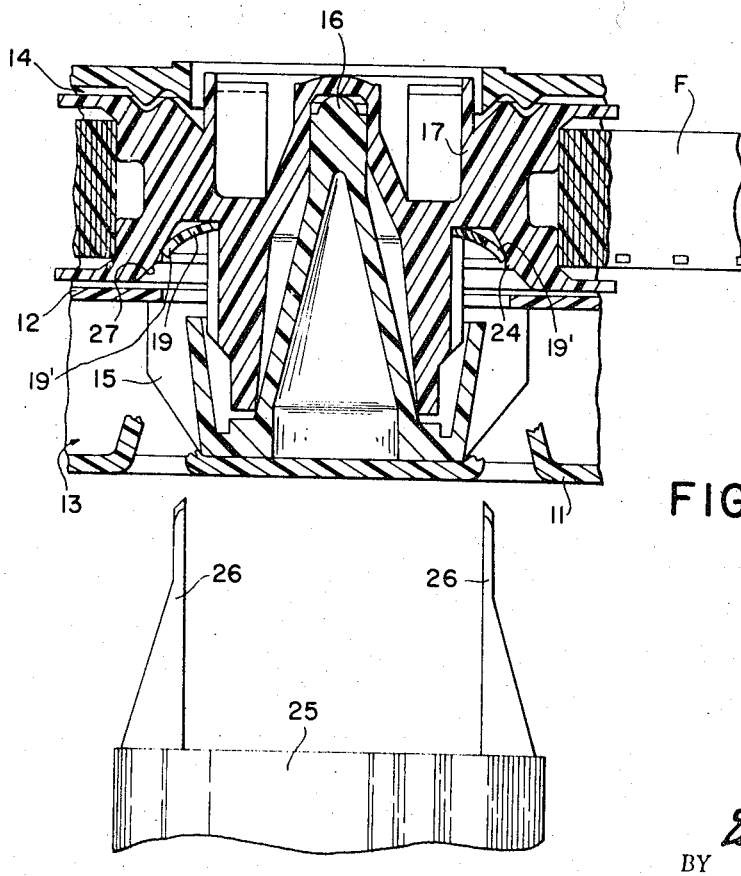
FIG. 5 is a view similar to FIG. 4 of the punctured cartridge with the punch withdrawn showing the shuttle captured within the core cavity.
Figure 6:
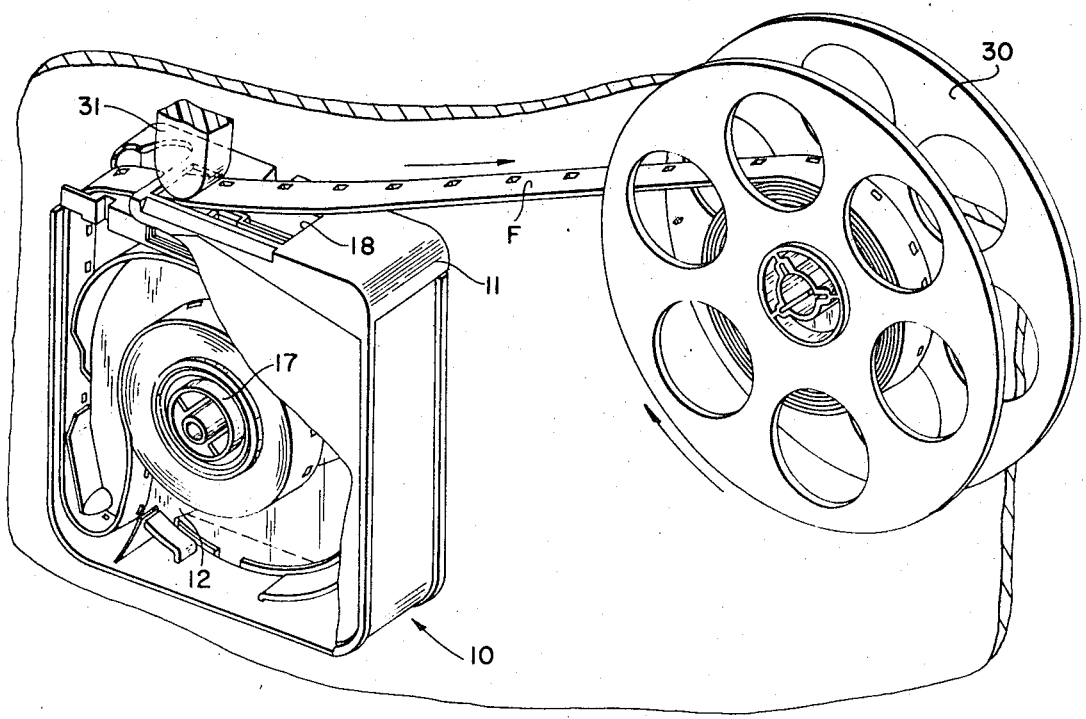
FIG. 6 is a perspective view of a cartridge with portions of the housing broken away, and a rewind reel on which film removed from the cartridge is wound.

In order to disengage the shuttle 19 according to this invention, as seen more clearly in FIG. 4, the punch punctures the two weakened portions of the cover 11, passes through the holes 29 in the hub 15 and deforms the shuttle 19 into a dished shape concave towards the punch as the shuttle is pushed into the cavity 27 defined by the spool 17. When the punch is withdrawn from the cartridge, as seen in FIG. 5, the shuttle 19 tends to return to its original flat shape, but it is prevented from doing so by the walls of the cavity 27 engaging tabs 19' on the shuttle. Thus, the deformed shuttle exerts force against the walls of the cavity, and it is retained within the cavity by an interference fit and by engagement of the rim 24 with the tabs 19'. With the shuttle disengaged in this manner the film may be attached to a rewind reel 30, as seen in FIG. 6, so that the exposed film may be withdrawn from the cartridge onto the reel which may be accomplished within a darkened chamber (not shown). During this winding operation, a smooth detent 31 can be held against the film on a bearing guide to displace the film from the edge of the aperture of the cartridge and prevent scratches on the film.

The invention has been described in detail with particular reference to preferred embodiments thereof, but it will be understood that variations and modifications can be effected within the spirit and scope of the invention.

We claim:

1. The method of removing film from a cartridge, said cartridge having a housing defining an exposure aperture, means defining a takeup chamber within the housing, means for guiding film past the exposure aperture to the takeup chamber, a takeup spool rotatably mounted in the takeup chamber with a lead portion of the film attached to the spool for winding up exposed film, and antibackup means for preventing rotation of the spool in one direction and for permitting rotation of the spool in the opposite direction for winding up film, said method comprising the steps of:
   driving a punch through the cartridge housing to displace the antibackup means to an inoperative position; and
   withdrawing the film through the exposure aperture as the film is unwound from the takeup spool.

2. The method of removing film from a cartridge, said cartridge having a housing defining an exposure aperture, means defining a takeup chamber within the housing, means for guiding film past the exposure aperture to the takeup chamber, a takeup spool rotatably mounted in the takeup chamber with a lead portion of the film attached to the spool for winding up exposed film, and an antibackup shuttle for preventing rotation of the spool in one direction and for permitting rotation of the spool in the opposite direction for winding up film, said method comprising the steps of:
   driving a punch through the cartridge housing into engagement with the antibackup shuttle to deform and displace the shuttle axially to an inoperative position in a cavity defined by the spool;
   withdrawing the punch from engagement with the shuttle to permit the shuttle to engage the sides of the cavity defined by the spool so that the shuttle is retained within the cavity; and
   withdrawing the film through the exposure aperture as the film is unwound from the takeup roll.

3. A film cartridge for use in a motion picture camera and adapted for cooperation with a tool to remove film therefrom, said cartridge comprising:
   a housing defining an exposure aperture;
   a partition within said housing to separate the interior of the housing into a supply chamber and a takeup chamber;
   a hub in the supply chamber for rotatably supporting a supply coil of film so that it can be withdrawn therefrom, said hub defining at least one opening on a predetermined path to permit passage of a tool along that path;
   guide means for guiding film advanced by the film advancing means from the supply chamber past the exposure aperture to the takeup chamber;
   a takeup spool rotatably mounted in the takeup chamber for winding up the advanced film; and
   antibackup means mounted in the cartridge and engaging the spool to prevent reverse rotation of the spool, said spool defining a recess for receiving and retaining the antibackup means when it is displaced by a tool inserted through the opening in the hub, whereby the antibackup means can be disabled by the tool to permit film to be unwound from the spool and withdrawn from the cartridge through the exposure aperture.

4. An improved film cartridge as claimed in claim 3, wherein the housing includes a sidewall having a predetermined thickness with a portion of said wall having a thickness less than the predetermined thickness to structurally weaken said portion, said portion of said sidewall being located along the predetermined path to reduce the force required to puncture the sidewall along the predetermined path.

5. An improved film cartridge as claimed in claim 3 wherein the spool has means for retaining the antibackup means within said recess, when the antibackup means is displaced into said recess.